United States Patent [19]
Rabenhorst et al.

[11] 3,788,162
[45] Jan. 29, 1974

[54] PSEUDO-ISOTROPIC FILAMENT DISK STRUCTURES

[75] Inventors: David W. Rabenhorst, Clarksville; Alan Brandt, Columbia; Kenneth E. Darnell, Silver Spring; James F. George, Bethesda, all of Md.

[73] Assignee: The Johns Hopkins University, Baltimore, Md.

[22] Filed: May 31, 1972

[21] Appl. No.: 258,303

[52] U.S. Cl.................. 74/572, 156/177, 156/296, 156/297, 161/55
[51] Int. Cl. ........................................... F16c 15/00
[58] Field of Search.......................... 74/572, 230.1; 15/179–181; 156/177, 296, 297; 161/55–60, 168–170; 416/244 A

[56] References Cited
UNITED STATES PATENTS

| 155,433 | 9/1874 | Durfee | 74/230.1 X |
|---|---|---|---|
| 1,448,180 | 3/1923 | Atwood et al. | 161/55 X |
| 3,296,886 | 1/1967 | Reinhart, Jr. | 74/572 |
| 3,496,799 | 2/1970 | Call | 74/572 |
| 3,672,241 | 6/1972 | Rabenhorst | 74/572 |
| 3,682,466 | 8/1972 | Huchette et al. | 156/177 X |

Primary Examiner—Charles J. Myhre
Assistant Examiner—F. D. Shoemaker

[57] ABSTRACT

The invention relates to inertial energy storage devices comprised of anisotropic filamentary elements and comprises several embodiments of a disc flywheel which, although consisting essentially of anisotropic elements, is effectively isotropic in total structural character. A preferred embodiment of the invention is generally formed by orienting several discrete annular layers of anisotropic filamentary elements at regular angles to each other, each anisotropic element in any one annular layer being parallel to the remaining elements in said layer. A second embodiment of the invention comprises randomly oriented anisotropic filamentary elements disposed within a rotary disc structure.

23 Claims, 12 Drawing Figures

PSEUDO-ISOTROPIC FILAMENT DISK STRUCTURES

STATEMENT OF GOVERNMENT INTEREST

The invention herein described was made in the course of or under a contract or subcontract with the Department of the Navy.

CROSS-REFERENCE TO RELATED APPLICATIONS

The present invention generally relates to the subject matter described in co-pending U. S. Patent Application, Ser. No. 60,047, filed July 31, 1970 now U.S. Pat. No. 3,672,241 issued June 27, 1972, entitled "Filament Rotor Structures", and Serial No. 167,643, filed July 30, 1971 now U.S. Pat. No. 3,698,262 issued Oct. 17, 1972, entitled "Fixed Element Rotor Structures", both patent applications by David W. Rabenhorst.

BACKGROUND OF THE INVENTION

Field of the Invention

The invention relates to energy storage devices, such as flywheels, and particularly to high-speed rotary structures having high volumetric and cost efficiency.

DESCRIPTION OF THE PRIOR ART

The flywheel has been used for centuries as an energy storage device. Since the flywheel is an inertial device governed by the laws of kinetic energy, maximum performance is attained at maximum speed, the performance being generally quadrupled with a two-fold increase in speed. The speed of the rotating body, however, cannot be increased beyond its bursting limit. In the prior art, three general flywheel configurations are predominant, namely, the flat disc type characterized by smooth parallel surfaces between the hub and the periphery; the rim type having a massive peripheral portion secured to the hub by spokes or by a solid wheel portion; and the more recently developed optimized disc.

Materials used to fabricate high-energy flywheels must have large specific strengths (strength/density) to enable the structure to be rotated at a high velocity. High strength steel has ordinarily been chosen as flywheel material. However, the strength/density ratio of an isotropic steel structure is substantially less than that obtainable with modern anisotropic filamentary materials. High strength filaments typically exhibit substantially greater strength-to-density characteristics over the best isotropic materials, such as steel or titanium. Rotary energy storage devices fabricated from these high strength filaments have greatly increased energy densities when compared to isotropic structures. However, the volumetric efficiencies, i.e., watt hours per unit volume of rotor, of most filamentary rotors is low. Further, the cost of these high strength filamentary rotors is often prohibitive for a number of applications.

The present inertial energy storage device offers substantial improvement in usable energy density due not only to the advantageous utilization of the high uniaxial strength of filamentary materials, but also to the increased packaging densities provided by the several embodiments of the invention, thereby improving volumetric efficiency. Further, costs of the several embodiments of the invention are significantly lower than that of prior art filamentary rotors.

The significance of the present energy storage device is best understood by its application to the urban vehicle. Although flywheels have been used in short-range vehicles, such as in the Swiss Oerlikon bus and in the British Gyreacta transmission, those devices produced only about three watt-hours per pound. Thus, energy density of the devices was even lower than that of available lead-acid batteries at the same discharge rate. However, certain characteristics of flywheels caused their use in preference to storage batteries, despite the problems then encountered in the use of flywheel structures. Firstly, the flywheel can be charged and discharged virtually an infinite number of times without degrading performance. Secondly, it can be charged at any reasonable rate. Thirdly, it can be discharged at any rate within the design limitations of ancillary equipment without degrading performance. These capabilities are largely responsible for the proposed use of flywheels in pollution-free urban vehicles. In most previous proposals, the rapid discharge capability of the flywheel has been primarily used to lend increased acceleration power to the vehicle in order to minimize the overall size of the main propulsion power plant. The present energy storage device provides a power plant of sufficient energy density to also enable its economic and practical use as the primary energy source in an urban vehicle.

SUMMARY OF THE INVENTION

The present invention encompasses the structure of several disc-type flywheels which are comprised of anisotropic filamentary elements but which are essentially "isotropic" in total structural properties. The isotropic character referred to herein is essentially limited to the structural character in the XY-plane, the Z axis being aligned with the axis of rotation of the structure. However, the molded random fiber disc does have "isotropic" character in all directions. Thus, the invention combines desirable characteristics of conventional isotropic flywheel structures, e.g., volumetric efficiency, with the recently conceived advantages of filamentary rotor structures, e.g., high energy density. The present disc structures permit substantial utilization of the uniaxial strength of each anisotropic filament while packaging the filaments into an extremely compact volume. The resulting structure, although comprised of anisotropic elements, has virtually identical structural character in all directions, i.e., the total structure is essentially isotropic.

Although full advantage of the high tensile strength of anisotropic filamentary materials cannot be gained in the present structures, the useful energy available from said structures is of substantial benefit due to the volumetric efficiencies of the structures. Further, the costs of fabrication are often substantially reduced with the present structures. Thus, even though the high tensile strengths of the filamentary materials are only fractionally utilized in the present structures, their high volumetric efficiencies and low costs provide distinct advantages. Since the fraction of the utilizable tensile strength of the anisotropic filaments is essentially a constant for each particular embodiment of the invention, use of higher strength filaments in any one of the embodiments results in increased performance.

A major advantage of anisotropic rotary energy storage structures is the favorable "failure mode" of the rotor itself. Isotropic steel flywheels normally rupture into two to four large fragments if design conditions are exceeded or if structural flaws develop, thereby resulting in the disasterous release of large, high kinetic energy fragments. This type of catastrophic failure is avoided in an anisotropic flywheel, and also to a finite degree in the "pseudo-isotropic" and essentially isotropic filamentary disc structures of the present invention. If design speed is exceeded or if flaws in materials or fabrication cause failure of an anisotropic flywheel, the filaments comprising the structure are "ground" to dust or to small straw-like fragments upon contact with a containing structure. Since only a small percentage of the kinetic energy of the structure is transmitted to the containing structure, the kinetic energy in the filaments appears to be dissipated by microfracture of both the filaments and the matrix material and, in certain instances, by vaporization of the matrix material. This inherent ability to absorb internally the major portion of failure energy by microfracture of the matrix and progressive fracture of the brittle filaments relieves the containment problem traditionally encountered with isotropie flywheels.

In a first embodiment, the invention provides a high performance inertial energy storage device of disc shape having "pseudo-isotropic" structural character. In particular, straight anisotropic filaments or composite rods of filamentary or "whisker" materials are first formed into identical annular plates, the filaments in each plate being parallel to each other. The annular plates are "stacked" with the centers thereof lying in a line perpendicular to the plane surfaces of the plates. The plates are rotated so that the planar axis of each plate, the planar axis being defined by the diameter of the plate which is parallel to the filaments comprising the plate, is offset at an angle to the planar axis of adjacent plates. The plates are then bonded together with a suitable matrix to form a unitary structure. Since the filaments in each plate are parallel to each other, each layer has anisotropic characer. However, the total structural character of the disc is virtually identical in the planes in which the filaments lie due to the sum of the uniaxial strength contributions of the angularly offset layers. Thus, each annular plate or layer of filaments forms a single lamina of a "pseudo-isotropic" disc flywheel. This isotropiclike character is achieved by offsetting the layers of filaments at regular angles of less than 90°. Small angular offsets tend to further strengthen the structure against interlaminar shear stresses. The flywheel structure thus formed may be of a constant thickness throughout the disc or may be optimized in shape according to particular design requirements, the optimized shape being generally thicker at the center of the disc and tapering to a relatively thin peripheral edge.

A second embodiment of the invention utilizes anisotropic filaments or whiskers in a fashion which reduces total flywheel cost while accepting a substantial reduction in the utilizable specific strength (tensile strength/density) of the filamentary material. According to the invention, randomly oriented filaments such as are available in relatively inexpensive layered or bulk form are pressed or molded into a homogeneous disc with a suitable matrix. The resulting structure, whether of a constant thickness or optimized in shape, is essentially isotropic in character. This random filament structure is not only less costly than steel or filament rotors, but also retains the advantageous "failure mode" of anisotropic rotors. A sufficiently large fraction of the tensile strength of the filaments employed in this disc flywheel is utilized to render the flywheel an attractive energy storage system, the watt.hours per dollar, or cost efficiency, of these embodiments being particularly attractive.

Accordingly, it is an object of the invention to provide high power-density energy storage devices which also have high energy densities.

It is a particular object of the invention to provide energy storage devices having high volumetric efficiency and which are relatively inexpensive to produce.

A further object of the invention is to provide rotary energy storage devices comprised of anisotropic filaments or rods but which have substantial isotropic structural character.

Another object of the invention is to provide rotary energy storage devices which dissipate the kinetic energy stored therein on failure of the device by microfracture of the anisotropic elements comprising the device.

A still further object of the invention is to provide "densely-packaged", efficient, economical, high performance and pollution-free energy storage devices useful in an urban vehicle for alleviating the increasing contribution of motorized vehicles to noise and air pollution problems.

Additional objects, advantages, and uses of the invention will become apparent from the following detailed description of the preferred embodiments thereof.

DESCRIPTION OF THE PREFERRED EMBODIMENTS

The performance, i.e., the stored kinetic energy of a rotary energy storage device, is directly porportional to the usable specific strength of the material used in the fabrication of the device. Isotropic materials, such as solid steel, have most often been used in the construction of "kinetic energy" structures, or "flywheels". However, the best isotropic material exhibits only a small fraction of the strength-to-density of anisotropic materials, such as boron filaments, graphite fibers, or certain glass fibers. Flywheels configured to utilize a significant portion of the anisotropic strength of uniaxial filamentary or whisker material have been shown to be capable of increased performance relative to flywheels composed of isotropic materials. However, these essentially anisotropic flywheels structures have proven costly and often too bulky for certain applications requiring high volumetric efficiency and/or low cost. The embodiments of the present invention provide rotary structures comprised of anisotropic filaments disposed within the structures in such a way as to maximize rotor weight within a given volume and to reduce fabrication costs while retaining the high energy densities of prior flywheel structures formed of anisotropic material.

Figure 1:
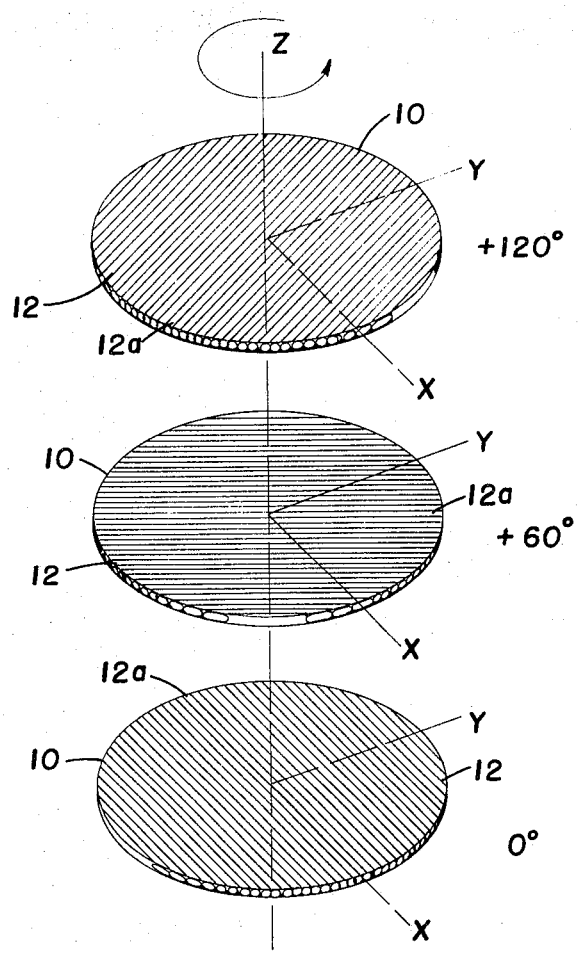
FIG. 1 is an exploded perspective view of three plates comprised of parallel anisotropic filaments, the plates illustrating the orientations of said filaments within a unitary disc flywheel structure comprising said plates.

The concept embodied in a first configuration of the invention is illustrated in simple form in FIG. 1. Identical flat circular plates 10 are seen to be comprised of anisotropic filaments 12, the filaments 12 being disposed side-by-side in the plates 10 in mutually parallel relation. The longest filament 12a in each plate 10 is that filament which extends through the geometrical center of each said plate. The filament 12a defines a planar axis of each plate 10. The remaining filaments 12 in each plate 10 are chords of the plate and are thereby progressively reduced in length with distance from the center of the plate. The plate 10 is essentially an "anisotropic" structure since the plate is strongest in the direction along the axes of the filaments 12. A disc flywheel is built up by stacking the plates 10 with their centers lying along the Z-axis of the reference axes shown. The plates 10 are rotated in the XY-plane of the reference axes so that the planar axis of each plate 10 is offset at a regular angle to the planar axes of adjacent plates 10. The filaments 12 of each plate form angles with contiguous filaments 12 in adjacent plates 10 which are equal to the angular offset of the respective planar axis. Essentially, the "senses" or effective uniaxial directions of the plates 10 are angularly offset. In the example shown, the three plates 10 are mutually offset at angles of 60°. An additional plate 10 added to the plates shown would have its "sense" coincide with that plate 10 on the opposite planar surface of the disc thus formed.

The plates 10 are laminated together through use of a suitable matrix material as will be described hereinafter, resulting in a disc structure having essentially isotropic character in the XY-plane. An angular offset of less than 90° is required to produce this "pseudo-isotropic" character. In the example shown, a 60° angular offset only requires three plates 10 or lamina to build up one "cycle" of a disc structure, a "cycle" consisting of the number of plates 10 required to rotate the "senses" of the plates through 360°. The number of plates 10 per cycle in some cases is easily determined by dividing the chosen angular offset into 180°, this relation holding as long as the quotient is an integer. A usable structure would normally be constructed from a multiple of this "cycle", e.g., a disc flywheel having a 60° offset between plates 10 could be formed from 10 times 3 or 30 laminae. This essentially isotropic character is necessary to accommodate the biaxial stress pattern (from radial and tangential stresses) that is present in a disc flywheel. The summation of the stresses acting on any point of the present invention is carried essentially along the axes of the filaments at that point, thereby utilizing the high "unidirectional" strengths of the anisotropic filamentary material. The strength of the laminated disc produced as shown in FIG. 1 is only a fraction of the unidirectional strength of either the filaments 12 or any one of the plates 10. However, this finite fractional utilization of these high unidirectional strengths provides a disc flywheel structure of high volumetric efficiency which can store significantly more energy than can an isotropic steel or aluminum disc flywheel.

A major advantage of the present flywheel structures relative to typical isotropic flywheels made from steel or aluminum is the relatively safe and more easily contained mode of failure of the invention. In the case of steel disc flywheels, for example, there is little change in the strength or stiffness of the structure during the development of a flaw in the structure. After the flaw develops, it propagates rapidly and the metal fails within a relatively short time. This flaw development mechanism is essentially the only manner by which a conventional isotropic failure occurs. By contrast, the present structures may fail according to a variety of failure mechanisms, such as delamination, matrix crazing and cracking, void growth, filament failure, or combinations thereof, These failure mechanisms generally progress at a very low rate after their initiation, thereby giving greater opportunity for detection of the flaw. The resistance to fracture of the present structures is greater than that of metal structures and increases with increasing tensile strength of the anisotropic elements comprising the structures. Since the structural stiffness of the several embodiments of the invention often changes after initiation of one or more of the above-named failure mechanisms, the life of the structures may be nondestructively determined by measuring the static resonances or dynamic damping of the structures.

The filaments 12 should now be further defined as to materials suitable for use in the structures to be described hereinafter. While anisotropic filamentary material of virtually any composition is potentially usable, certain materials naturally exhibit greater uniaxial tensile strength/density ratios than others. The matrix material both holding the filaments within each plate 10 and also holding the plates together must have great strength and be compatible with the filamentary material. Boron filaments in an epoxy or magnesium matrix, graphite fibers in epoxy, and glass fibers in an epoxy or polyester matrix are examples of filament/matrix combinations suitable for use in the invention. The filament diameter varies greatly among these materials, thereby frequently making it necessary to use a number of layers of the filaments 12 to build up each one of the plates 10 in order to give a thickness to the plate which allows practical fabrication of the disc structure. Certain filaments are sufficiently large that a single layer of the filaments will suffice to form a single plate 10. When cost is a predominate factor in material choice, Fiberglass with a high weight percentage of suitably oriented glass fibers may be chosen for the several embodiments of the invention. Even wood cut properly, i.e., with the "uniaxial" grain thereof running parallel over the surface of a thin flat circular layer as will be described hereinafter, can be an inexpensive, though lower performance, material choice. E-glass or S-glass filaments in an epoxy or polyester matrix are promising materials from the standpoint of costs and performance. These materials may be first formed into slender cylindrical rods or solid bars (~1/16 inch square) and the rods or bars formed into the plates 10. In some cases, a plurality of layers of these rods or bars may be built up to form each one of the plates 10. Improvements in these materials, such as by protecting the glass filaments in Fiberglas manufacture from both physical and water damage by applying an epoxy-polysulfide coating at the instant the glass filament is drawn, will increase the usable tensile strengths of the materials, thus making the characteristic fractional portion of the utilizable tensile strength a larger value. High purity quartz, fused silica, various organic fibers, and a variety of whisker-based materials are other anisotropic filamentary materials from which the embodiments of the invention may be fabricated.

Figure 2:
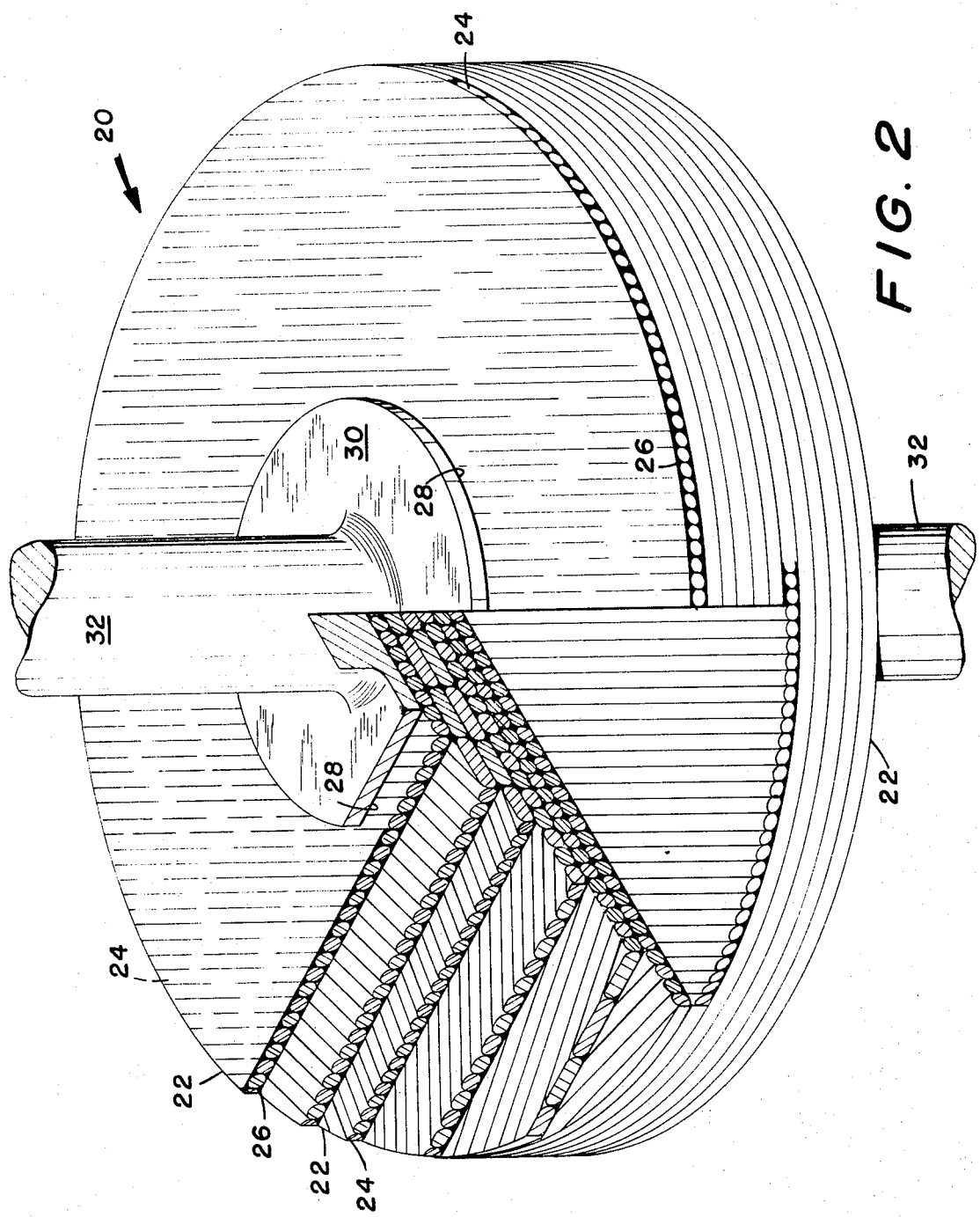
FIG. 2 is a perspective in partial section of a "pseudo-isotropic" disc flywheel formed of layers of parallel anisotropic filaments, the layers being turned at angles to each other.

FIG. 2 shows a constant-thickness laminated disc flywheel at 20 which is formed according to the principles described for FIG. 1. The disc flywheel 20 is comprised of a plurality of annular plates or lamina 22 which are formed from parallel filaments 24. For purposes of illustration, the lamina 22 are pictured as being comprised of only one layer of filaments 24. Although a single layer of parallel filaments 24 is practical with larger diameter filaments, each lamina 22 will usually be formed of a number of layers of parallel filaments, as will be discussed more fully hereinafter. The filaments 24 are held together in each lamina 22 by a suitable matrix material 26. The lamina 22 share a common vertical line of centers, which line is perpendicular to the planar surfaces of the lamina 22 and which is also the axis of rotation of the flywheel 20. Assuming this axis of rotation to be the Z-axis of a three-dimensional set of reference axes, the lamina 22 are angularly offset at regular angular intervals to each other in the XY-plane. The planar axis of each lamina 22 (as defined in the discussion of FIG. 1) is rotated through a given angle relative to the planar axes of adjacent lamina 22. If the uppermost lamina 22 is considered to have its planar axis extending in the 0° direction in the XY-plane, then a second lamina 22 adjacent to the uppermost lamina has its planar axis positioned at an angle of 30° thereto. The third lamina 22 is then positioned at an angle of 30° to the second lamina 22 (60° to the uppermost lamina 22). This regular angular offset continues until the next successive lamina 22 would be oriented in the same direction as the uppermost lamina 22. The number of lamina 22 required to complete this rotation may be termed the "cycle" for a particular angular offset. For 30° six lamina 22 are required to complete one "cycle". For 45°, one cycle requires four lamina. Any multiple of this cycle may be used to build up a suitably thick disc flywheel. Any regular angular offset producing at least three equally spaced lamina orientations within a cycle gives an isotropic-like capability. The lamina 22 are bonded together by the matrix material 26 to produce a unitary structure. The matrix material 26 covering the uppermost lamina 22 is shown to be clear so that the orientation of the filaments 24 therein may be more clearly seen in the broken lines. An adhesive 28, which may be the same material as the matrix material 26, is used to join hub plates 30 to the opposite planar surfaces of the flywheel 20. Shaft elements 32, which are best formed integral with their respective plates 30, extend from the centers of said plates 30 with their geometrical center lines coincident with the axis of rotation of the flywheel 20. Generally, the hub plates 30 are approximately one-third the diameter of the flywheel 20 in order to provide sufficient surface area for bonding of said plates to the flywheel.

Figure 3:
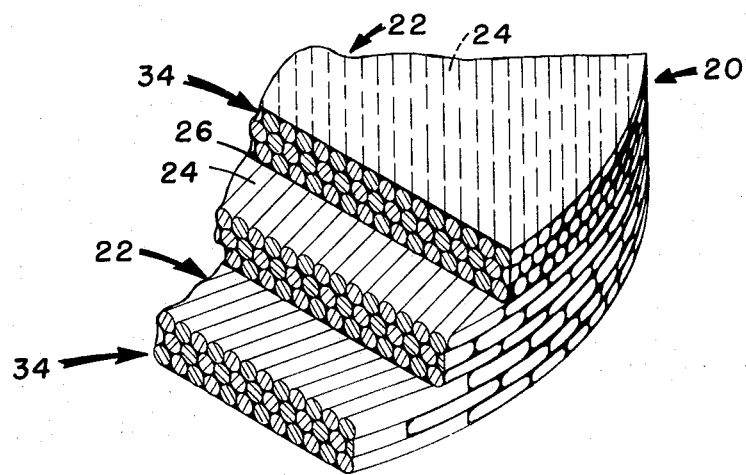
FIG. 3 is an enlarged detail perspective of a portion of a disc flywheel wherein multiple layers of anisotropic filaments form separate annular plates or lamina, the plates being turned at angles to each other.

FIG. 3 is an enlarged view of a typical disc flywheel 20 wherein each of the laminar 22 is formed of a plurality of layers 34 of filaments 24. The filaments 24 is each layer 34 are mutually parallel not only to each other but also to the filaments in the other layers 34 which form a particular lamina 22. In this embodiment of the invention, the filaments 24 in each lamina 22 are parallel to each other but do not all lie in the same plane. Since each lamina 24 is intended to contribute equally to the overall thickness of the flywheel 20, if any of the lamina 22 are formed from either a finite number of layers 34 or from a finite thickness of filaments 24, then all of the lamina 22 should be so formed in order to balance the resulting structure.

Figure 4:
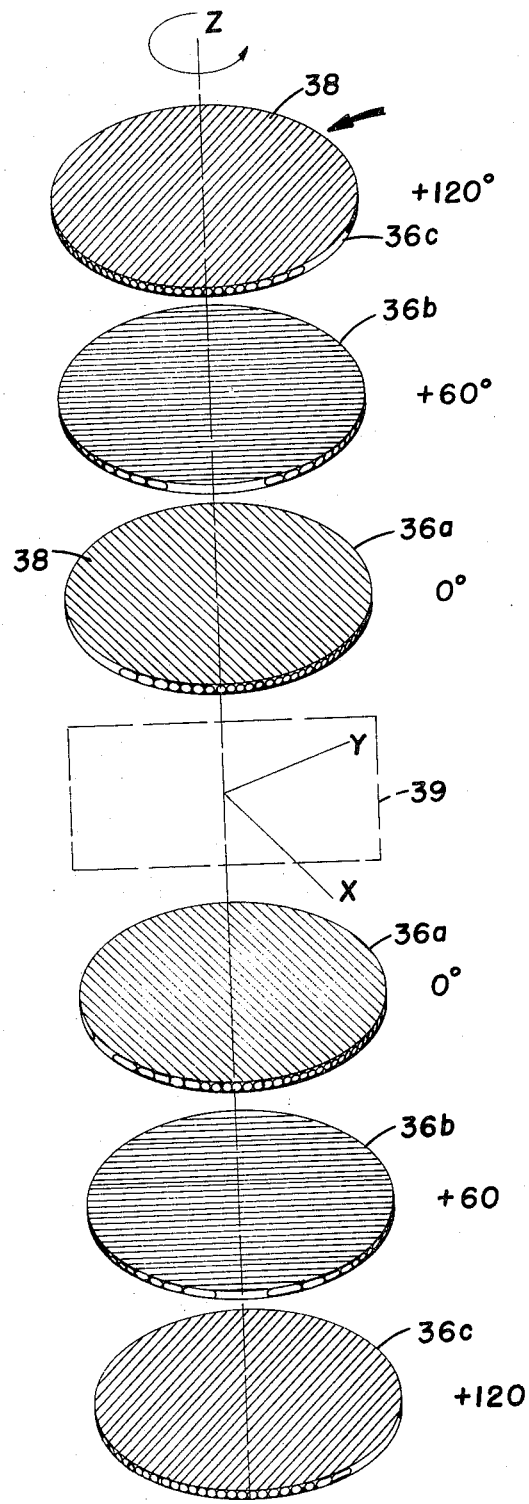
FIGS. 4 and 5 are idealized exploded perspective views of the disc flywheels comprised of plates of parallel anisotropic filaments, the plates being oriented according to the illustrations of these figures to produce mid-plane symmetry within said disc flywheels.
Figure 5:
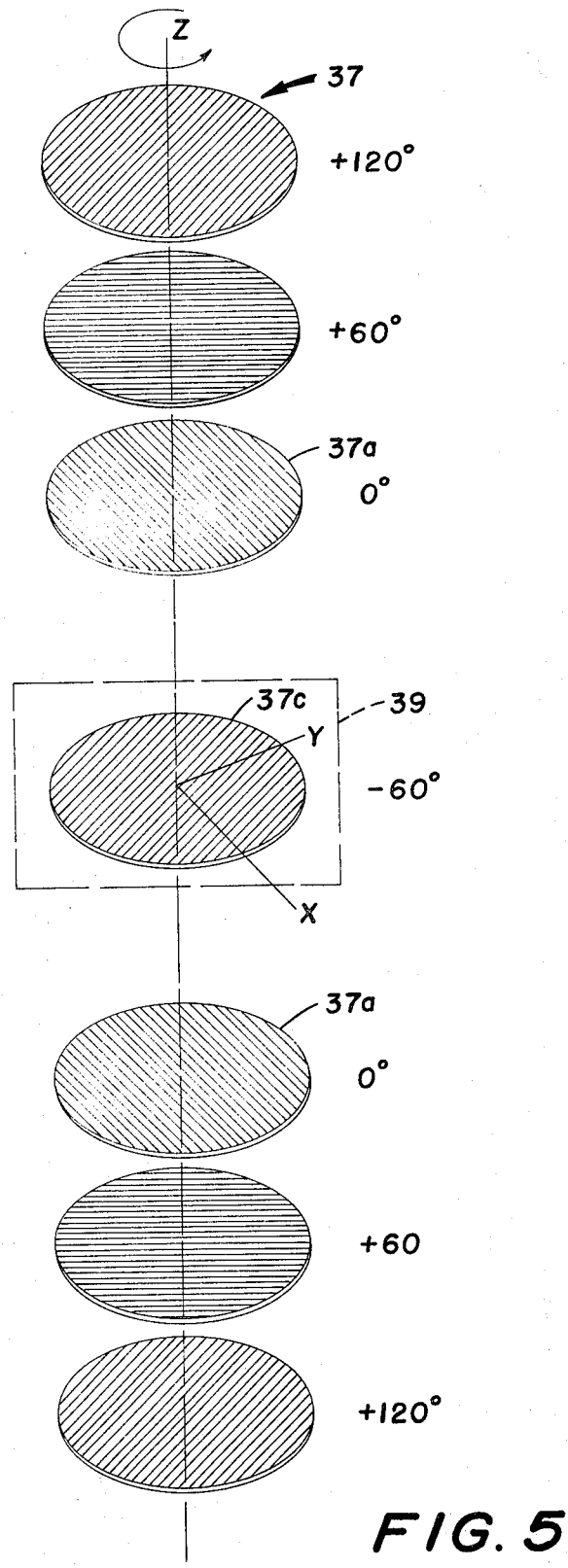

A disc flywheel such as is shown in FIG. 2 may be fabricated in a symmetrical fashion about a plane taken perpendicular to the axis of rotation and through the geometrical center of the disc. FIGS. 4 and 5 simply illustrate two alternate methods for forming disc flywheels having this "mid-plane symmetry."As can be seen in the exploded construction views of these figures, each lamina 36 lies at a given distance above the mid-plane 39 of the total structure and has an identical lamina 36 located at the same distance below the mid-plane. For example, the laminae 36a in FIG. 4 are identical both in structural properties and in their orientation, all of the lamina 36 being comprised of parallel filaments 38. As has been previously discussed, the lamina 36 could be formed from multiple layers of the filaments 38 rather than the single layer shown for simplicity in FIG. 4. The structure of FIG. 4 is built up by offsetting each of the lamina 36 above the mid-plane 39 at a relative angle of sixty degrees in the XY-plane. Thus, in the simple example shown, three lamina 36 lie above the mid-plane 39 of the structure. The three lamina 36 lying below the mid-plane of the structure are essentially mirror images across the mid-plane 39 of the three lamina 36 which lie above the mid-plane. The corresponding pairs of lamina 36a, 36b and 36c respectively have the same orientation and also have identical structural properties.

FIG. 5 illustrates a second method for producing mid-plane symmetry in the disc structure. Since the structure of FIG. 5 is comprised of an odd number of lamina 37, the mid-plane 39 is taken through the center lamina 37c, an equal number of lamina 37 lying on opposite sides of the lamina 37c. Any two lamina 37, such as the lamina pair 37a, lying at a given distance from the mid-plane 39, one of each on opposite sides thereof, have identical structural properties and the same orientation within the structure. Provision of mid-plane symmetry in the present flywheel structures de-couples the effects of bending and stretching and reduces out-of-plane warping, thus producing a more dynamically stable structure.

Figure 6:
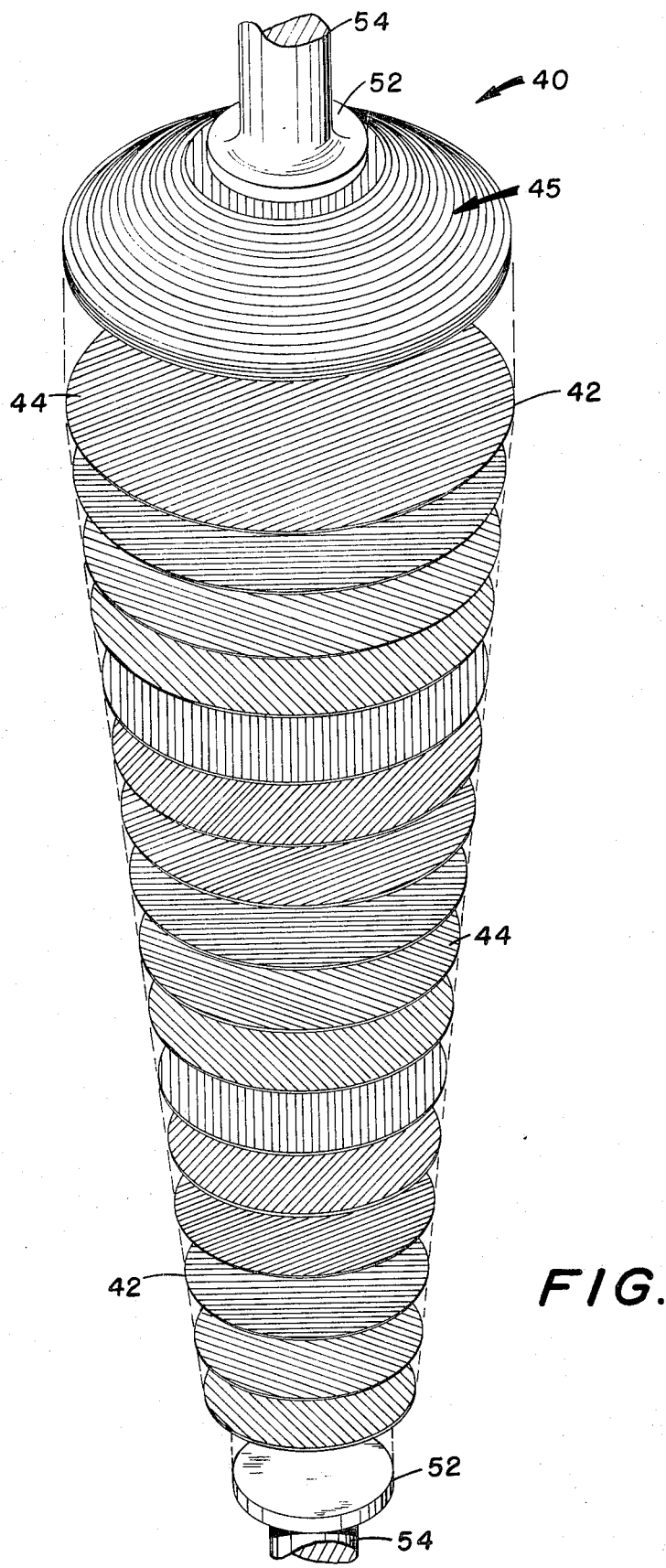
FIG. 6 is a perspective of an optimally shaped disc fly-wheel comprised of regularly oriented laminations of parallel anisotropic filaments, the laminations in the lower portion of the structure being separated to illustrate the orientations of the filaments thereof.

An "optimized" disc flywheel is shown at 40 in FIG. 6. Since the combination of radial and tangential stresses acting on the disc flywheel 40 is greatest along its axis of rotation, shaping of the flywheel to provide greater mass at and near the axis of rotation thereof acts to relieve the increased biaxial stress pattern in this area. The shape shown in FIG. 6 is a simplified shape which is relatively easy to fabricate and which, as is the case with other more "optimal" shapes, causes the summation of the major stress components at points on the disc to be essentially equal. As seen in FIG. 6, the lower portion of the optimized disc flywheel 40 is "delaminated" to illustrate the orientation of lamina 42, each lamina 42 being comprised of mutually parallel filaments 44. The lamina 42 may be oriented according to the principles described for FIGS. 1, 4, or 5. To obtain symmetry about the mid-plane of the flywheel 40, the lamina orientations described in FIGS. 4 or 5 must be used. In the flywheel shown, the lamina 42 are offset at 30° angles to each other. The oppositely facing surfaces 45 extending from the enlarged central portion of the disc to the periphery thereof are defined by respective lines of rotation which are substantially mirror images across a longitudinal center of the flywheel 40. These lines of rotation in this instance are straight lines, thereby producing relatively simple and readily fabricated surfaces 45. Hub plates 52 are bonded to opposite surfaces of the flywheel 40 and have shaft elements 54 formed integrally therewith, the shaft elements 54 having their longitudinal centerlines disposed along the axis of rotation of the disc flywheel 40.

Figure 7:
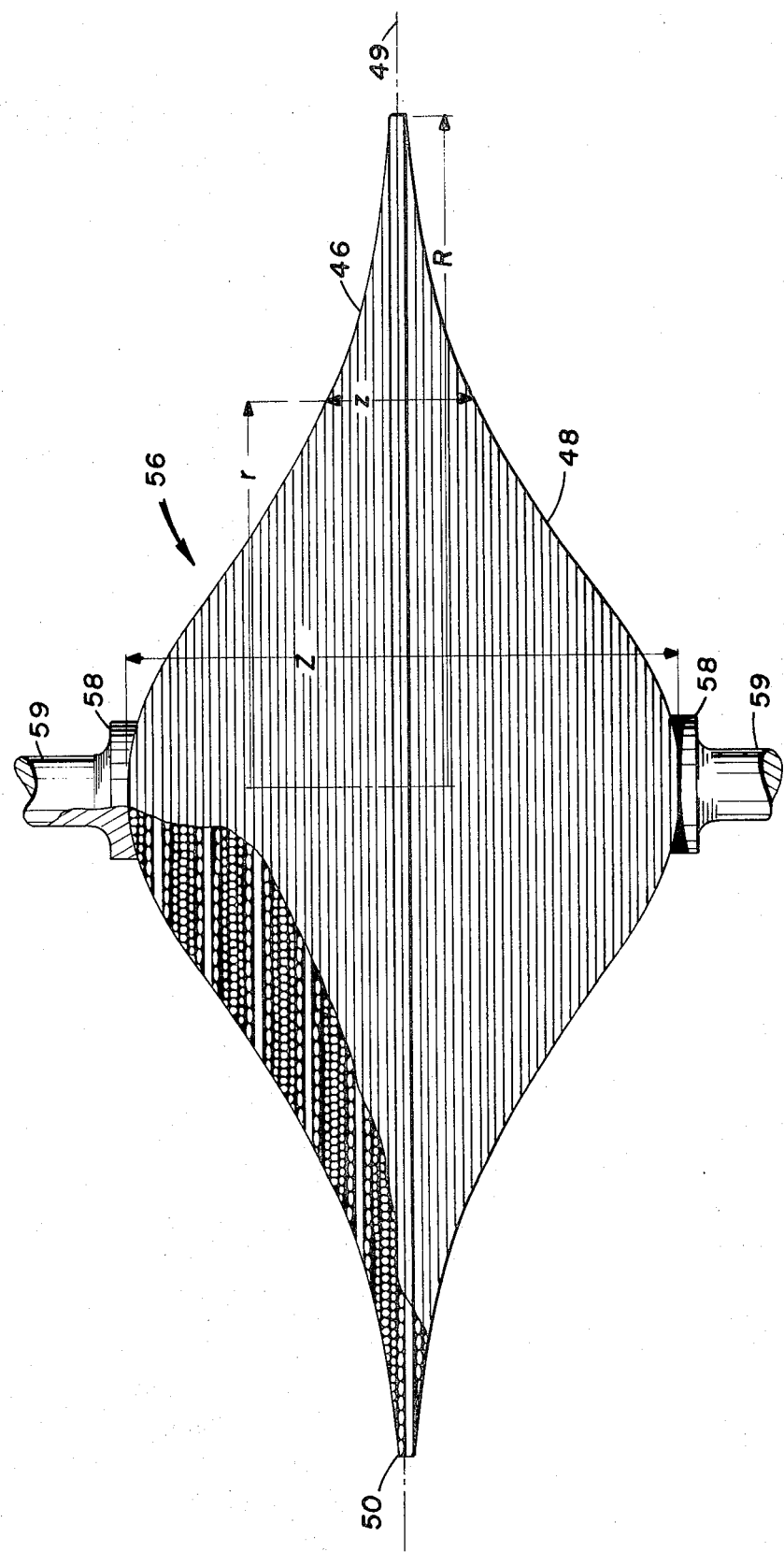
FIG. 7 is an elevation of an optimally shaped disc flywheel comprised of laminations of parallel anisotropic filaments, the flywheel being shown partly broken away to illustrate the alignment of the filaments.

Various flywheel characteristics may be optimized according to different curvatures for the aforementioned lines of rotation, the disc flywheel 56 of FIG. 7 providing an efficient example of exponentially shaped lines of rotation. As seen in FIG. 7, oppositely facing surfaces 46 and 48 are defined by respective exponential lines of rotation which are substantially mirror images across a longitudinal center line 49 of the disc flywheel 56. The surfaces 46 and 48 produced by the lines of rotation are characterized by a generally reverse curvature in cross-sectional profile, said surfaces being essentially convex near the axis of rotation of the flywheel 56 and sloping to a substantially concave shape near the periphery 50 of the disc. Thus, the shape of the disc flywheel 56 is seen to generally decrease in thickness from a maximum at and around the axis of rotation to a minimum at the periphery 50 thereof. To achieve maximum theoretical rotor optimization, the thickness at the periphery 50 would continuously diminish to infinity, thus practically producing a razor sharp edge. Practical considerations dictate forming the periphery 50 into a substantially square cut edge. Those portions of the flywheel which constitute the shaped surfaces 46 and 48 have lamina of progressively increasing diameter in a fashion similar to that described for the structure of FIG. 6.

By assuming constant stress in the disc flywheel 56, the following relationship defines a family of exponential shapes which form the surfaces 46 and 48:

$$z = Ze^{-k\bar{r}^2} \qquad (1)$$

wherein:
$z$ = the thickness of the flywheel 56 taken at a given point on the surface of the structure
$Z$ = the maximum thickness of the structure
$\bar{r}$ = the quotient of the radial distance $r$ of the given point from the axis of rotation divided by the radius $R$ of the flywheel 56
$k$ = a numerical constant
$e$ = the base of the natural system of logarithms The shape of the disc flywheel 56 is that shape given by Equation (1) when k is taken equal to 4. Any choice of $k$ produces a different exponential shape, the value of 4 giving a particularly efficient one. Hub plates 58 are bonded to opposite surfaces of the flywheel 56 and have shaft elements 59 formed integrally therewith, the shaft elements 59 having their longitudinal centerlines disposed along the axis of rotation of the disc flywheel 56.

Figure 8:
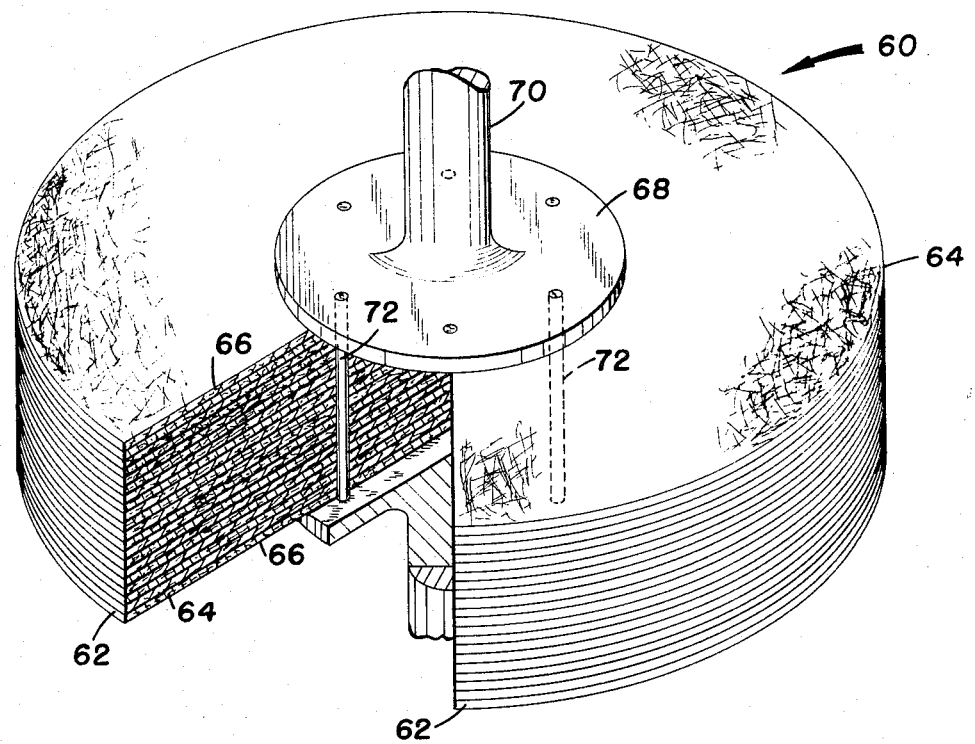
FIG. 8 is a perspective in partial section of a disc flywheel comprised of laminations of randomly oriented anisotropic filaments, the structure being held together by a hub.

Given an acceptable level of performance, cost considerations often outweight the desirability for high energy densities. Filamentary flywheels having good volumetric efficiencies, favorable failure modes, and low costs can be fabricated with an acceptable energy density penalty. Such flywheels illustrated by the constant thickness, random filament laminated disc 60 of FIG. 8, are useful due primarily to their low materials and manufacturing costs. The laminated disc 60 is formed from a plurality of annular lamina 62, the lamina 62 being formed from randomly oriented filaments 64. Pressed sheets of randomly oriented filaments, such as glass fibers, are commonly available at low cost. The lamina 62 are aligned with their centers lying along an axis perpendicular to the planar surfaces of said lamina and are bonded together with a suitable matrix material 66. Pressing techniques may be employed to produce a compact, high filament density disc flywheel having high volumetric efficiency. Hub plates 68 having integral shaft elements 70 extending centrally from the outer surfaces thereof are bonded to the opposite faces of the disc 60. In this and other embodiments of the invention, the hub mounting may be improved by connecting the plates 68 with rods 72 spaced at equal angles around the outer portions of the plates 68 and equidistant from the axis of rotation of the disc 60. The rods 72 may be welded to the hub plates 68 or affixed thereto by other known means.

Figure 9:
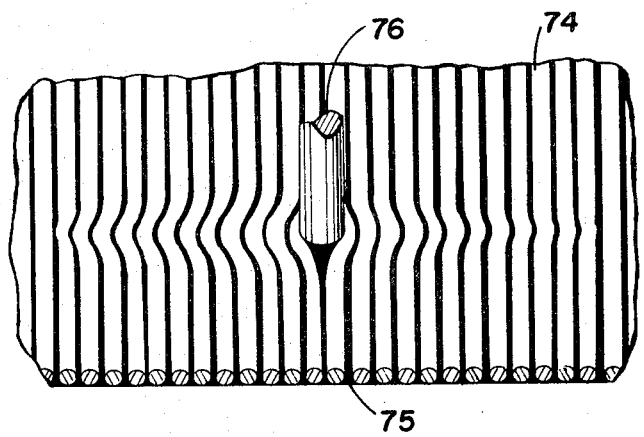
FIG. 9 is an idealized detail perspective view of a rod such as is shown in FIG. 8 having parallel filaments fitted therearound.

FIG. 9 further illustrates the use of rods for assuring the structural integrity of the hub mounting means. In the embodiment shown in FIG. 9, the filaments 74 are oriented as in the embodiment shown in FIG. 2 and portions thereof must be slightly curved to fit around rods 76 of the hub mounting means, thereby causing a slight performance loss in the total structure. Matrix material 75 which bonds the filaments 74 together occupies a relatively larger volume around the rod 72, the proportion of matrix material decreasing with distance from the rod to allow the filaments 74 to resume their straight orientation. That is, the further the filaments are from the rod, the less affected they are by said rod and the straighter they become. The rods 76 are best formed from an isotropic material such as steel.

Figure 10:
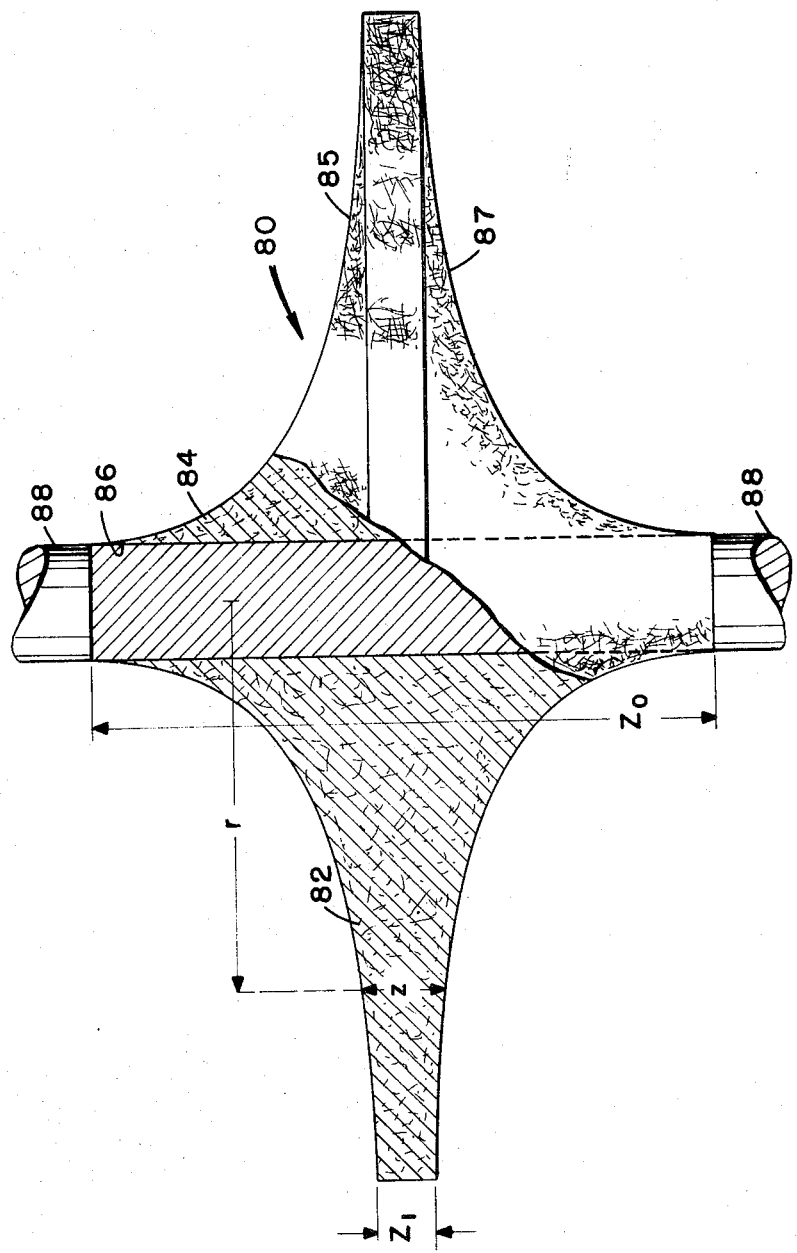
FIG. 10 is an elevation of an optimally shaped disc flywheel comprised of randomly oriented anisotropic filaments, the flywheel being shown partly broken away and in section to illustate the disposition of filaments within the structure.

The embodiment of the invention shown in FIG. 10 is also attractive primarily because of its relatively low cost of manufacture. A disc flywheel 80 is formed from randomly oriented filaments 82 which are mixed with a suitable matrix material 84 and molded into the desired shape. The filaments 82 are thus randomly oriented in three dimensions. The random filamentary structure of the disc flywheel 80 allows molding of a central hole 86 without cutting or interrupting oriented filaments as would be the case in certain other embodiments of the invention. A shaft 88 may then be bonded within the hole 86. The shape of the flywheel 80 is optimized with the oppositely facing surfaces 85 and 87 being defined by hyperbolic lines of rotation which are substantially mirror images across a longitudinal centerline of the flywheel. The surfaces 85 and 87 essentially slope from the axis of rotation of the flywheel 80 in a substantially concave fashion to the periphery of the disc, thereby decreasing in thickness from a maximum at and around the axis of rotation to a minimum at the periphery thereof. In the example shown in FIG. 10, the diameter of the central hole 86 substantially equals the diameter of the shaft 88, and is further equal to one-tenth of the disc diameter. A family of hyperbolic shapes can then be defined by:

$$Z = Z_1 r^{-q} \quad (2)$$

where:
$r$ = the radial distance of a given point from the axis of rotation
$Z$ = the thickness of the flywheel 80 at the given point on the surface of the structure
$Z_1$ = the thickness of the flywheel 80 at its peripheral outer edge, and
$q$ = a numerical constant If the thickness $Z_o$ of the flywheel 80 at the shaft 88 is further taken to be 10 times the thickness $Z_1$ at the outer edge of the flywheel and if $q$ is taken equal to 1, then the thickness of the flywheel 80 at a radial distance r from the axis of rotation is given by $$Z = Z_1/r \quad (3)$$

which is the particular shape shown in FIG. 10.

Figure 11:
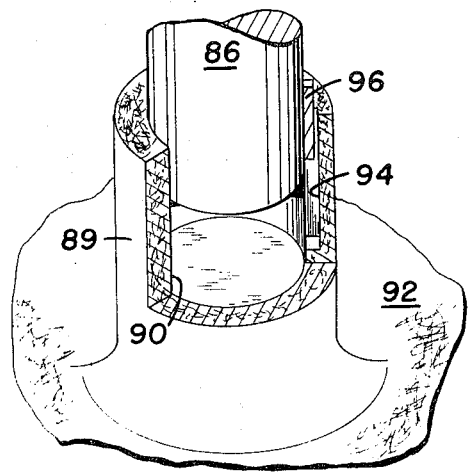
FIG. 11 is an enlarged detail perspective of a portion of disc flywheel comprised of randomly oriented anisotropic filaments, the enlarged portion thereof comprising integrally molded shaft connection means; and, FIG. 12 is a perspective in partial section of a disc flywheel comprised of laminations fabricated from uniaxially-oriented wood layers.

Disc structures such as the constant thickness disc or the optimized shapes described above which do not have central holes may be formed with integral shaft attachment means such as shown in FIG. 11. Raised annular bosses 89 having axial annular insets 90 therein are integrally molded with a random fiber disc flywheel 92, the upper portion of said flywheel 92 being visible in the figure. Separate shaft elements 86 may then be bonded into the inserts 90 or otherwise joined thereto. A slot 94 and key 96 may be used to improve the connection between the shaft element 86 and the annular boss 89.

Figure 12:
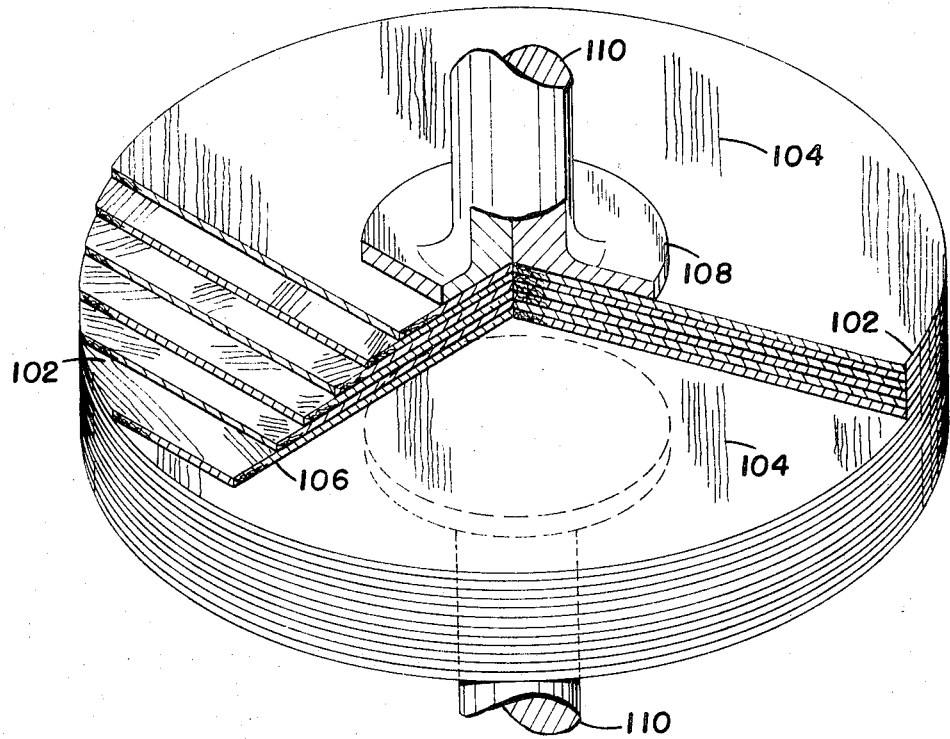

A particular embodiment of the invention formed according to the principles described for the illustration shown in FIG. 1 is seen in FIG. 12. The disc 100 is formed of relatively thin annular layers or lamina 102 of wood, the fibers 104, being essentially anisotropic filaments, being oriented in substantially parallel relation within each lamina 102. The direction of the wod fibers 4 in each lamina 102 is normally referred to as the "grain" of the wood. The direction of the grain of each lamina 102 is offset at a given angle to adjacent lamina 102 as have been previously described. A matrix material 106 having desirable strength and modulus of elasticity properties is chosen to bond the lamina 102 together. Hub plates 108 having integral shaft elements 110 are bonded to the disc 100 in a manner also described previously.

The embodiments of the invention described above offer the prospects of high specific energy storage within a compact unit while retaining a relatively safe mode of filure. It is understood that the foregoing description of the invention is illustrative, and that various modifications to the structure and manner of fabrication of the flywheels disclosed herein may be made without departing from the scope of the invention.

We claim:

1. An energy storage structure rotatable about an axis of rotation extending transversely therethrough, the structure comprising a plurality of anisotropic filament-like members, the members being formed into a solid disc and being disposed within the structure in intersecting relation to produce biaxial resistance to the radial and tangential stress pattern acting on the structure.

2. The energy storage structure of claim 1, wherein the anisotropic filament-like members are formed into circular plates, the members within any given plate being parallel, and wherein each plate is disposed within the structure at an angle with respect to certain other plates.

3. The energy storage structure of claim 2, wherein said structure has a symmetrical cross-sectional profile defined by opposed surfaces about the axis of rotation, said structure being relatively thick around said axis and relatively thin about the periphery thereof.

4. The energy storage structure of claim 3, wherein the surfaces of the symmetrical cross-sectional profile each have the shape of an exponential curve and are symmetrical about a plane extending through the geometrical center of the structure and perpendicular to the axis of rotation.

5. The energy storage structure of claim 1, wherein said structure is symmetrically contoured in cross-section about said axis of rotation and has a center portion of maximum thickness around said axis and a peripheral end portion of minimum thickness, the center portion of the structure having a cross-sectional thickness diminishing non-uniformly from said maximum to said minimum according to the relation:

$$z = Ze^{-k\bar{r}^2}$$

wherein:
$z$ = the thickness of the structure taken at a given point on the surface of the structure
$Z$ = the maximum thickness of the structure $\bar{r}$ = the quotient of the radial distance of the given point from the axis of rotation divided by the radius of the structure $k$ = a numerical constant $e$ = the base of the natural system of logarithms.

6. The energy storage structure of claim 5, wherein the numerical constant $k$ is equal to 4.

7. The energy storage structure of claim 1, wherein the anisotropic filament-like members are randomly oriented within the structure to produce biaxial resistce to the stresses acting on said structure.

8. The energy storage structure of claim 7, wherein said structure has a symmetrical cross-sectional profile defined by opposed surfaces about the axis of rotation, said structure being relatively thick around said axis and relatively thin about the periphery thereof.

9. An energy storage structure rotatable about an axis of rotation extending transversely therethrough, the structure comprising plurality of anisotropic filament-like members which are randomly oriented within the structure, the members forming a disc shape which is symmetrically contoured in cross-section about said axis of rotation and having a center portion of maximum thickness around said axis and a peripheral end portion of minimum thickness;

the center portion of the structure having a cross-sectional thickness diminishing non-uniformly from said maximum to said minimum according to the relation:

$$Z = Z_1 r^{-q}$$

wherein:

$Z$ = the thickness of the structure taken at a given point on the surface of the structure $Z_1$ = the thickness at the peripheral end portion of the structure $r$ = the radial distance of the given point from the axis of rotation $q$ = a numerical constant.

10. The energy storage structure of claim 9, wherein a dimension $Z_o$ is the maximum thickness of the structure at the center portion thereof, wherein $Z_o/Z_1 = 10$, and wherein the numerical constant $q = 1$.

11. The energy storage structure of claim 9, and further comprising shaft means, the structure having a central hole for receiving said shaft means therein.

12. The energy storage structure of claim 7, and having shaft elements affixed to opposite planar surfaces thereof, the structures further comprising integral raised bosses extending from said opposite planar surfaces of the structure, the bosses being disposed along the axis of rotation of the structure and having axial insets disposed therein for receiving the shaft elements.

13. The energy storage structure of claim 1, and further comprising hub means, the hub means comprising a hub plate disposed on each of the planar surfaces of the structure, shaft elements extending from the center of each hub plate and aligned with the axis of rotation of the structure, and rods extending through the structure and joining said hub plates.

14. The energy storage structure of claim 1, wherein the anisotropic filament-like members are formed into circular plates, the members within any given plate being randomly oriented, and wherein the plates are bonded together into a disc.

15. An energy storage structure rotatable about an axis of rotation extending transversely therethrough, the structure comprising a plurality of anisotropic filament-like members.

a multiplicity of the members being bonded together into flat solid circular plates and having the longitudinal axis of each member oriented therein substantially parallel to adjacent members, a planar axis of each plate being defined by the longitudinal axis of the member extending through the geometrical center of said plate, the plates being aligned within the structure with their centers lying along the axis of rotation thereof, the planar axis of each plate forming an equal angle with the planar axes of adjacent plates.

16. The energy storage structure of claim 15, wherein each plate at a given distance above a plane taken perpendicular to the axis of rotation of the structure and through the midpoint of said structure is oriented within the structue in the same direction as a corresponding plate located at the same given distance below said plane.

17. The energy storage structure of claim 16, and wherein the plates are bonded together into a disc shape comprising two opposing surfaces and a circular peripheral edge, the structure being symmetrically contoured in cross-section about said axis of rotation, and having a center portion of maximum thickness and a peripheral edge portion of minimum thickness.

18. The energy storage structure of claim 15, wherein each plate is comprised of a plurality of layers of the anisotropic filament-like members, the members within each plate being parallel to each other.

19. The energy storage structure of claim 15, wherein the angle formed by the planar axes of adjacent plates is equal to 60°.

20. The energy storage structure of claim 15, wherein the angle formed by the planar axes of adjacent plates is equal to 45°.

21. The energy storage structure of claim 15, wherein the angle formed by the planar axes of adjacent plates is equal to 30°.

22. The energy storage structure of claim 15, wherein the plates comprise sheets of wood, the filamentary grain of which sheets extend in the same direction.

23. An energy storage structure rotatable about an axis of rotation extending transversely therethrough, comprising a plurality of flat solid circular plates, each said plate being comprised of mutually parallel anisotropic filament-like members, the plates being aligned within the structure with their centers lying along the axis of rotation thereof, each plate being disposed within the structure at an angle with respect to adjacent plates; and matrix means for bonding the filament-like members within each plate and for bonding the plates into a unitary structure.

* * * * *